United States Patent Office 3,373,038
Patented Mar. 12, 1968

3,373,038
ESTROGENIC COMPOUNDS AND ANIMAL GROWTH PROMOTERS
Edward B. Hodge, Phil H. Hidy, and Herbert L. Wehrmeister, Terre Haute, Ind., assignors to Commercial Solvents Corporation, a corporation of Maryland
No Drawing. Continuation-in-part of application Ser. No. 620,264, Mar. 3, 1967. This application Oct. 18, 1967, Ser. No. 676,079
10 Claims. (Cl. 99—2)

ABSTRACT OF THE DISCLOSURE

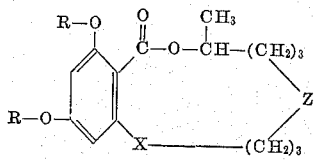

where R is selected from the group consisting of hydrogen, lower alkyl, and lower saturated acyclic acyl; Z is a radical selected from the group consisting of >C=O, >CHOH, and >CHOR; and X is a radical selected from the group consisting of

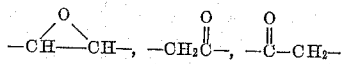

and

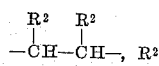

is selected from the group consisting of hydrogen, hydroxyl and —N(R³)₂ and R³ is selected from the group consisting of hydrogen, alkyl of about 1 to 15 carbon atoms, monocyclic aryl and aralkyl of about 1 to 15 carbon atoms, with the proviso that at least one R² is hydroxyl; and animal feeds containing growth promoting amounts thereof.

---

This application is a continuation-in-part of application Ser. No. 561,402, filed June 29, 1966, now abandoned, and application Ser. No. 620,264, filed Mar. 3, 1967, now abandoned.

The present invention relates to new compounds and an object of the present invention is to provide compounds which exhibit estrogenic activity or aid in increasing the rate of growth in meat-producing animals, e.g., cattle, lamb and swine. The compounds of this invention are illustrated by the formula:

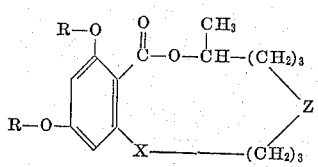

where R is hydrogen, substituted or unsubstituted alkyl e.g. lower alkyl such as methyl, pentyl etc., and acyl, e.g., lower saturated acyclic radicals such as acetyl and valeryl; Z is >C=O, >CHOH, or >CHOR; and X is

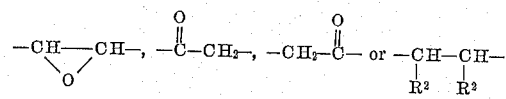

where R² is hydrogen, hydroxyl or —N(R³)₂; R³ is hydrogen, substituted or unsubstituted alkyl or aralkyl, e.g., of about 1 to 15 carbon atoms, particularly lower alkyl, such as methyl, ethyl, etc., or benzyl, or substituted or unsubstituted aryl, e.g., phenyl or bromophenyl; with the proviso that at least one R² is hydroxyl.

The compounds of the present invention can be produced from the compound:

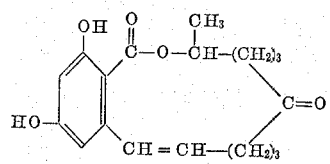

hereinafter referred to as the fermentation estrogenic substanc (F.E.S.) by reaction with formic acid in the presence of a catalytic amount of perchloric acid and hydrolysis of the resulting formate to add a hydroxyl at the ethylenic double bond. F.E.S. epoxides are produced by reaction of an F.E.S. ether with perbenzoic, monoperphthalic or peracetic acids and F.E.S. glycols can be produced either directly from a F.E.S. ether with hydrogen peroxide or indirectly by hydrolysis of an epoxide. F.E.S. epoxides are intermediates in the production of F.E.S. amino alcohols which are formed by reaction of an epoxide with ammonia or an amine. In general, amine of the formula NH(R³)₂ where R³ has the above designated meaning are suitable.

It is desirable, if not necessary, to protect the hydroxyl groups against undesirable side reactions before the reactions described above. This can be accomplished by converting the hydroxyl groups to ester groups, e.g., acetyl groups, as taught in U.S. Patent 3,239,342, and subsequently removing the masking group to regenerate the hydroxyl group. The hydroxyl group can be regenerated from, for example, a diacetate by hydrolysis by refluxing in an aqueous sodium bicarbonate solution containing ethanol to increase solubility. The compounds of the present invention where Z is >CHOH can be prepared from compounds described in U.S. Patent 3,239,348 and where Z is >CHOR can be prepared from the compounds described in U.S. Patent 3,239,356. When Z is >CHOH or >CHOR, the carbon atom is an asymmetric carbon atom.

The compounds can be administered to animals by any suitable method including oral and parenteral administrations. For example, the compound can be blended with ordinary feed containing nutritional values in an amount sufficient to produce the desired rate of growth and can thus be fed directly to the animals, or the compound can be suspended in a suitable injection suspension medium such as peanut oil and injected parenterally. The amount of compound fed to an animal, of course, varies depending upon the animal, desired rate of growth and the like.

When the new compounds are to be administered in feeds, an animal feed composition may be prepared containing the usual nutritionally-balanced quantities of carbohydrate, proteins, vitamins and minerals, together with the compound of the present invention. Some of these usual dietary elements are grains, such as ground grain and grain by-products; animal protein substances, such as those found in fish meal and meat scraps, vegetable proteins like soybean oil meal or peanut oil meal; vitaminaceous materials, e.g., vitamin A and D mixtures; riboflavin supplements and other vitamin B complex members; and bone meal and limestone to provide minerals. A type conventional feed material for use with cattle includes alfalfa hay and ground corn cobs together with supplementary vitaminaceous substances if desired. The following examples illustrate the invention.

Example I

F.E.S. 2,4-diacetate is refluxed with formic acid containing a small amount of perchloric acid to produce

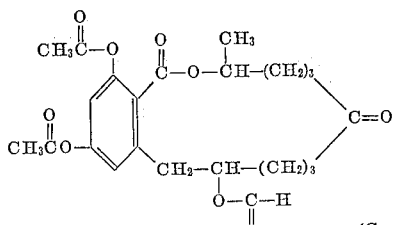

(Compound 1)

and

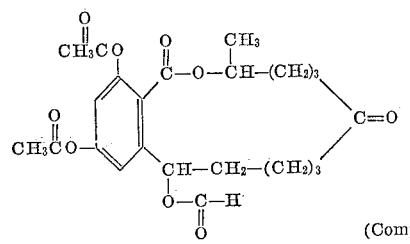

(Compound 2)

which are hydrolyzed by refluxing for less than 30 minutes in the presence of aqueous sodium hydroxide containing ethanol to form

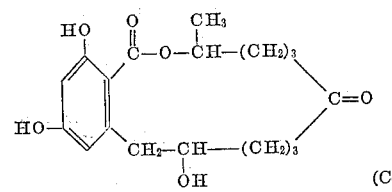

(Compound 3)

and

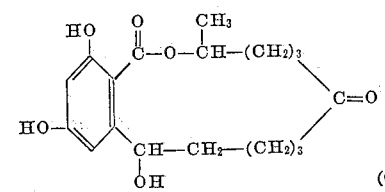

(Compound 4)

Example II

Compound 3 is oxidized at mild conditions, i.e., 50° C., with hydrogen peroxide in acetic acid solution to produce the keto derivative

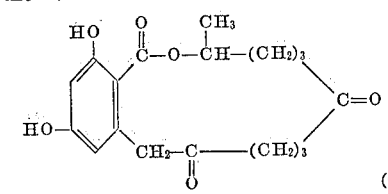

(Compound 5)

Example III

The 2,4-dimethylether of F.E.S. is warmed in acetic acid solution with hydrogen peroxide at about 80° C. to produce

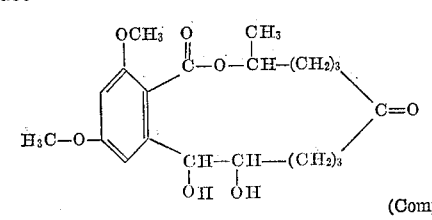

(Compound 3)

Example IV

Perbenzoic acid is slowly added to a solution of F.E.S. 2,4-diacetate in chloroform at 0 to 5° C., to produce the F.E.S. epoxide

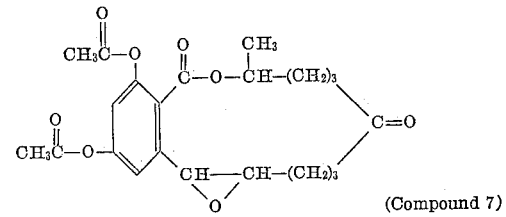

(Compound 7)

Example V

Compound 7 is hydrolyzed by refluxing for less than 30 minutes with a dilute aqueous sodium hydroxide containing ethanol.

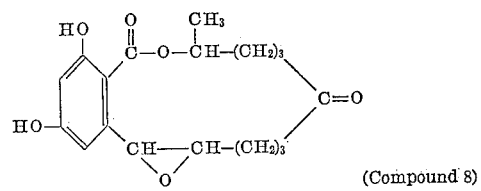

(Compound 8)

Example VI

The F.E.S. glycol

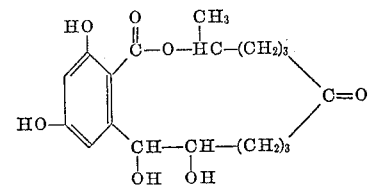

is produced upon heating an aqueous solution of compound 8 at slightly above room temperature in the presence of an acidic catalyst, i.e., HCl.

Example VII

Compound 7 reacts with ammonia at 45 to 60° C. in acid solution, HCl, to produce

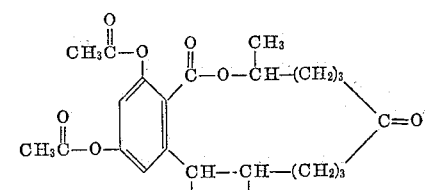

(Compound 9)

and

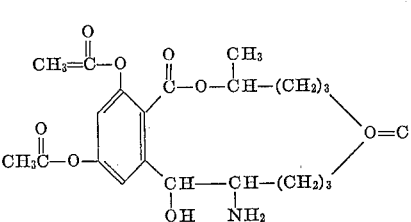

(Compound 10)

which are hydrolyzed by refluxing for less than 30 minutes with aqueous sodium bicarbonate containing ethanol to form

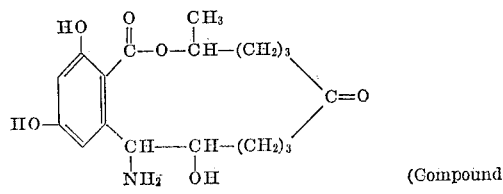

(Compound 11)

and

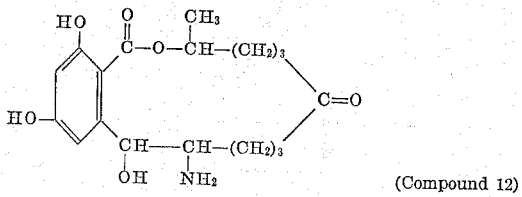

(Compound 12)

Example VIII

Compound 8 reacts according to Example VII with methylamine, dimethylamine, ethylamine, aniline, n-hexylamine, laurylamine, ethanolamine, methylpropylamine, benzylamine and N-methylaniline to produce the corresponding F.E.S. amino alcohol.

Example IX

F.E.S. 2, 4-dibenzylether is reacted according to the processes of Examples I and III to produce the corresponding F.E.S. glycols.

Example X

Six head of cattle are fed a daily ration of alfalfa hay and ground corn cobs containing from 5 to 20 ounces of compound 3 per 100 pounds of feed and their rate of growth is improved.

Example XI

Six head of cattle are fed a daily ration of alfalfa hay and ground corn cobs containing from 5 to 20 ounces of compound 6 per 100 pounds of feed and their rate of growth is improved.

Example XII

Six head of cattle are fed a daily ration of alfalfa hay and ground corn cobs containing from 5 to 20 ounces of compound 12 per 100 pounds of feed and their rate of growth is improved.

Example XIII

The compound

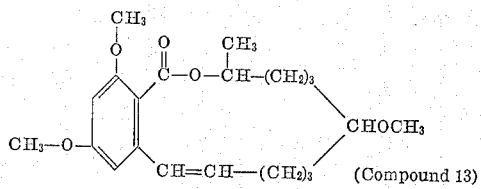

(Compound 13)

is reacted according to the processes of Examples I and III to produce the corresponding monohydroxy compounds and glycols, respectively.

Example XIV

The compound

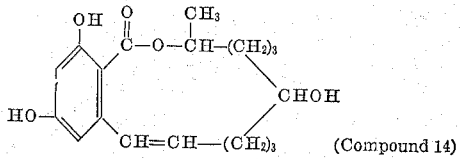

(Compound 14)

is reacted according to the process of Examples I and III to produce the corresponding monohydroxy compounds and glycols, respectively.

Example XV

Compound 13 is reacted according to the process of Example IV to produce the corresponding epoxide.

Example XVI

Compound 14 is reacted according to the process of Example IV to produce the corresponding epoxide.

Example XVII

Compound 13 is reacted according to the process of Example II to produce the corresponding keto derivative.

Example XVIII

Compound 14 is reacted according to the process of Example II to produce the corresponding keto derivative.

Example XIX

The compound produced in Example XV is reacted according to the process of Example VIII, except for the hydrolysis, to produce the corresponding amino alcohol derivative.

Examples XX

The compound produced in Example XVI is reacted according to the process of Example VIII, except for the hydrolysis, to produce the corresponding amino alcohol derivative.

The following are specific examples of animal feed compositions of this invention useful for increasing the rate of growth and feed efficiency of young animals to market weight.

Example XXI

For young beef cattle, i.e., calves to yearlings running to two year olds, each animal is given 5 to 20 milligrams per day of the compound produced in Example II intimately admixed in about 18 to 22 pounds per head per day of a complete pelleted ration for about 180 days. The complete pelleted ration includes in addition to the compound of Example II the following:

| | | |
|---|---|---|
| Barley | percent | 40–43 |
| Molasses dried beet pulp | do | 34.5–37.5 |
| Alfalfa pellets | do | 8.0 |
| Tallow | do | 2.5 |
| Calcium carbonate | do | .30 |
| Urea | do | .30 |
| Phosphorus source | do | .40 |
| Salt | do | .50 |
| Molasses | do | 10.00 |
| Trace mineral | do | 0.5 |
| Vitamin A | MMI.U./ton | 2–4 |

(Note: Milo or corn, for example, can be substituted for the barley.)

The compound of Example II is admixed with the above ingredients in a stationary blender or a feed mix truck in the following amounts in grams per ton to provide an appropriate complete pelleted feed with dosage levels ranging from 5 to 90 milligrams per head per day.

| Grams/ton | Mg./head/day |
|---|---|
| .5 | 5 |
| 1.0 | 10 |
| 2.0 | 20 |
| 4.0 | 40 |
| 8.0 | 80 |

These gram amounts are premixed with, for example, 10 pounds of soybean hulls prior to admixture with the other ingredients.

Example XXII

For young swine, i.e., six week old pigs to about 100 pound pigs, each animal is given 5 to 20 milligrams per day of the compound of Example III intimately admixed in about 1½ to 5½ pounds per head per day of a grower ration until it reaches a weight of about 100 pounds. When the swine weigh between 90 and 125 pounds the feed is changed to one whereby each animal is given 20 to 50 milligrams per day of the compound of Example III intimately admixed in about 5½ to 10 pounds per head per day of a finisher ration until it reaches market weight of about 220 pounds. The grower and finisher ration include in addition to the compound of Example III the following:

| | Grower, Percent | Finisher, Percent |
|---|---|---|
| Ground Yellow Corn | 77 | 86.7 |
| Soybean Meal (44% protein) | 16 | 6.5 |
| Meat and Bone Scraps (50% protein) | 2.5 | 2.5 |
| Dehydrate Alfalfa (17%) | 2.5 | 2.5 |
| Steamed Bone Meal | 0.5 | 0.5 |
| Ground Limestone | 0.5 | 0.3 |
| Iodized Salt | 0.5 | 0.5 |
| Vitamin, Antibiotic and Trace Mineral Premix | 0.5 | 0.5 |

The compound of Example III is admixed with the above ingredients in a blender in the following amounts in milligrams per pound to provide an appropriate feed with dosage levels ranging from 6 to 96 milligrams per head per day.

| Mg./pound | Mg./head/day |
|---|---|
| 2 | 6 |
| 4 | 12 |
| 8 | 24 |
| 16 | 48 |
| 32 | 96 |

*Example XXIII*

For 4 to 10 month old lambs weighing 50 to 70 pounds, each animal is given 1 to 15 milligrams per day of the compound of Example V, intimately admixed in about 3 to 6 pounds per head per day of a complete ration for 30 to 90 days. The complete ration includes in addition to the compound of Example V the following:

| | Pounds |
|---|---|
| Finely ground corn cobs | 630 |
| Ground corn | 600 |
| Dehydrated alfalfa meal | 300 |
| Dried molasses | 120 |
| Soybean meal (44% protein) | 300 |
| Dicalcium phosphate | 14 |
| Trace mineral salt | 17 |
| Premix vitamin, mineral and antibiotic | 19 |

The compound of Example V is admixed with the above ingredients in a blender in the following amounts in milligrams per pound to provide an appropriate complete feed with dosage levels ranging from 1 to 15 milligrams per head per day.

| Mg./pound | Mg./head/day |
|---|---|
| .5 | 2 |
| 1.0 | 4 |
| 1.5 | 6 |
| 2.0 | 8 |
| 2.5 | 10 |
| 3.75 | 15 |

*Example XXIV*

For broilers, i.e., day old to four week old chicks, a grower feed is prepared for feeding to the chicks for the first four weeks and a finisher feed is prepared for feeding the four week old chicks for the last five weeks until they reach market weight of two and a half to three pounds dressed. For each pound of weight gain, the chicks eat about 1.5 to 2 pounds of feed. Thus they eat about 1.5 pounds of feed during the first four weeks and about five pounds of feed during the next five weeks. During the course of this feeding schedule, each bird should receive a total of about 12 to 36 milligrams of the compound of Example VII in the grower and finisher feed each of which includes in addition to the compound of Example VII the following:

| | Grower (lbs) | Finisher (lbs.) |
|---|---|---|
| Ground Yellow Corn | 1,000 | 1,200 |
| Soybean Meal (44% protein) | 700 | 500 |
| Fish Meal (60% protein) | 100 | 80 |
| Alfalfa Meal | 50 | 50 |
| Meat and Bone Scraps | 0 | 30 |
| Animal Fat | 80 | 80 |
| Dicalcium Phosphate | 35 | 40 |
| Iodized Salt | 10 | 10 |
| Limestone | 15 | |
| Premix Vitamins, Trace Minerals and Antibiotics | 10 | 10 |

It is claimed:
1.

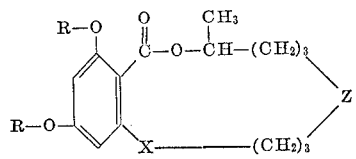

where R is selected from the group consisting of hydrogen, lower saturated alkyl, and lower saturated acyclic acyl; Z is selected from the group consisting of $>C=O$, $>CHOH$, and $>CHOR$; and X is a radical selected from the group consisting of

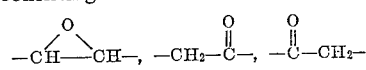

and

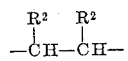

$R^2$ is selected from the group consisting of hydrogen, hydroxyl and $-N(R^3)_2$ and $R^3$ is selected from the group consisting of hydrogen, alkyl of about 1 to 15 carbon atoms, monocyclic aryl and aralkyl of about 1 to 15 carbon atoms, with the proviso that at least one $R^2$ is hydroxyl and that when X is either

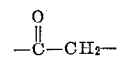

or

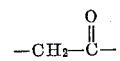

R is hydrogen.

2. The compound of claim 1 wherein each R is hydrogen and Z is $>C=O$.

3. The compound of claim 2 wherein X is the radical

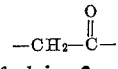

4. The compound of claim 2 wherein X is the radical

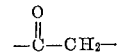

5. The compound of claim 2 wherein X is

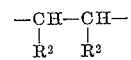

and both $R^2$'s are hydroxyl.

6. The compound of claim 2 wherein X is

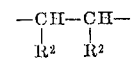

and one $R^2$ is hydrogen.

7. The compound of claim 2 wherein X is
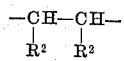
and one $R^2$ is $-N(R^3)_2$.
8. The compound of claim 7 wherein $R^3$ is hydrogen.
9. The compound of claim 7 wherein $R^3$ is alkyl.
10. An animal feed composition comprising a nutrient ration and a growth promoting amount of the compound of claim 1.
No references cited.
A. LOUIS MONACELL, *Primary Examiner.*
H. H. KLARE, *Assistant Examiner.*